United States Patent
Marcigliano et al.

(10) Patent No.: US 8,825,325 B2
(45) Date of Patent: Sep. 2, 2014

(54) CONTROL METHOD FOR CLOSING A CLUTCH IN AN AUTOMATIC MANUAL TRANSMISSION

(75) Inventors: Francesco Marcigliano, Maranello (IT); Davide Montosi, Formigine (IT)

(73) Assignee: Ferrari S.p.A. (IT)

( * ) Notice: Subject to any disclaimer, the term of this patent is extended or adjusted under 35 U.S.C. 154(b) by 721 days.

(21) Appl. No.: 12/717,529

(22) Filed: Mar. 4, 2010

(65) Prior Publication Data

US 2010/0228456 A1    Sep. 9, 2010

(30) Foreign Application Priority Data

Mar. 4, 2009   (IT) .............................. BO2009A0127

(51) Int. Cl.
| | | |
|---|---|---|
| *G06F 7/00* | (2006.01) | |
| *G06F 17/00* | (2006.01) | |
| *G06F 19/00* | (2011.01) | |

(52) U.S. Cl.
USPC ................................. 701/68; 701/70; 477/180

(58) Field of Classification Search
CPC .............. F16D 2500/1086; F16D 2500/30406; F16D 2500/3067; F16D 2500/30812; F16D 2500/50684; F16D 2500/70426; F16D 2500/70528; F16D 2500/70626
USPC ............... 701/67, 68, 22, 62, 52, 70, 54, 102; 477/5, 34, 35, 70, 79, 86, 97, 98, 94, 477/81, 78, 62, 203, 171, 131, 109, 107; 74/11, 336, 15.84, 745, 473.21, 74/473.12, 473.11, 360, 336 R, 335, 331, 74/329, 325; 475/218, 159, 121
See application file for complete search history.

(56) References Cited

U.S. PATENT DOCUMENTS

| | | | | |
|---|---|---|---|---|
| 5,119,695 A | * | 6/1992 | Milunas et al. .................. | 477/98 |
| 6,424,903 B1 | * | 7/2002 | Amisano et al. ................ | 701/67 |
| 6,524,223 B2 | * | 2/2003 | Graf et al. ...................... | 477/109 |
| 6,656,090 B2 | * | 12/2003 | Matsumura et al. .......... | 477/171 |
| 6,760,159 B2 | * | 7/2004 | Nakai ........................... | 359/576 |

(Continued)

FOREIGN PATENT DOCUMENTS

EP         1174303 A2    1/2002

OTHER PUBLICATIONS

"Italian Application Serial No. ITb020090127, Search Report dated Nov. 20, 2009", 2 pgs.

*Primary Examiner* — Khoi Tran
*Assistant Examiner* — Rachid Bendidi
(74) *Attorney, Agent, or Firm* — Schwegman Lundberg & Woessner, P.A.

(57) ABSTRACT

A control method for closing a clutch in an automatic manual transmission during a gear shifting to pass from a current gear to a successive gear; the automatic manual transmission has a gearbox provided with at least one primary shaft and at least one secondary shaft connected to driving wheels, and at least one clutch interposed between the primary shaft of the gearbox and a drive shaft of an engine; the control method includes, during the closing of the clutch, when the rotation speed of an engine side of the clutch is close to the rotation speed of a gearbox side of the clutch, the steps of: determining a speed difference between the rotation speed of the engine side of the clutch and the rotation speed of the gearbox side of the clutch; determining an acceleration target according to the speed difference; and determining a target torque to be transmitted through the clutch according to the acceleration target.

12 Claims, 4 Drawing Sheets

(56) References Cited

U.S. PATENT DOCUMENTS

| | | |
|---|---|---|
| 6,881,171 B2 * | 4/2005 | Kuhstrebe et al. ............... 477/78 |
| 6,951,526 B2 * | 10/2005 | Kuhstrebe et al. ............... 477/97 |
| 7,211,028 B2 * | 5/2007 | Matsumura et al. ........... 477/124 |
| 7,217,223 B2 * | 5/2007 | Saeki et al. .................... 477/175 |
| 7,234,366 B2 * | 6/2007 | Hou ................................... 74/11 |
| 7,286,922 B1 * | 10/2007 | Fischer et al. ................... 701/51 |
| 7,908,070 B2 * | 3/2011 | Le Neindre et al. ............. 701/68 |
| 8,043,194 B2 * | 10/2011 | Soliman et al. .................... 477/5 |
| 2006/0236798 A1 * | 10/2006 | Krauss et al. .................... 74/325 |
| 2008/0207393 A1 * | 8/2008 | Minami ........................... 477/77 |
| 2008/0208423 A1 * | 8/2008 | Minami ........................... 701/67 |
| 2009/0292428 A1 * | 11/2009 | Corigliano et al. ............. 701/51 |
| 2009/0320635 A1 * | 12/2009 | Terada et al. ................. 74/473.36 |

\* cited by examiner

CONTROL METHOD FOR CLOSING A CLUTCH IN AN AUTOMATIC MANUAL TRANSMISSION

RELATED APPLICATION

This application claims the benefit of priority, under 35 U.S.C. Section 119, to Italian Patent Application Serial No. B02009A 000127 filed on Mar. 4, 2009 which is incorporated herein by reference in its entirety.

The present subject matter relates to a control method for closing a clutch in an automatic manual transmission.

BACKGROUND OF THE INVENTION

Automatic manual transmissions (commonly named "AMT") are increasingly widespread, which transmissions are structurally similar to manual gearbox of the traditional type except for the clutch pedal and the gear selection lever operated by the driver being replaced by corresponding electric or hydraulic servo controls.

An automatic manual transmission is provided with a transmission control unit, which while shifting gears, drives the servo controls associated with clutch and gearbox to disengage the current gear and engage the successive gear; furthermore, while shifting gear, the transmission control unit interfaces with the engine control unit to conveniently adjust the torque delivered by the engine so as to adapt the engine operation to the transmission ratio change and to avoid an undesired temporary increase/decrease of engine rpm when the clutch is open or in all cases either while opening or closing. Such a control mode is applied both to traditional single clutch gearboxes and to double clutch gearboxes; the only difference between the two types of gearboxes resides in that in a single clutch gearbox there is a central interval of time in which the clutch is completely open (i.e. the engine idly turns without load), while in a double clutch gearbox the two clutches mutually cross over and therefore a clutch opening/closing situation exists during the whole shifting operation.

A clutch has an engine side angularly integral with the drive shaft of the engine (possibly by interposing a transmission shaft) and a gearbox side, integral with a primary shaft of the gearbox, which is in turn angularly integral with the driving wheels through the currently engaged gear; the rotation speed of the two sides of the clutch is adapted when closing the clutch, because when the clutch is completely closed, the two sides of the clutch are angularly integral with each other, and thus rotate at the same rotation speed. The rotation speed of the driving wheels is imposed by the forward traveling speed of the vehicle, and varies with relatively long times because of the high total inertia of the vehicle itself; instead, the rotation speed of the drive shaft of the engine may be quickly varied in a controlled manner when the drive shaft is idling (i.e. when it is separated from the driving wheels) due to the low total inertia of the engine. Therefore, in the known, currently marketed automatic manual transmissions, when closing a clutch, the rpm of the drive shaft (i.e. of the engine side of the clutch) is controlled according to the rpm of the gearbox side of the clutch (thus according to the rotation speed of the driving wheels, multiplied by the transmission ratio of the currently engaged gear), so as to make a connection between the rotation speed of the engine side of the clutch and the rotation speed of the gearbox side of the clutch as "smooth" as possible. Indeed, if the connection between the rotation speed of the engine side of the clutch and the rotation speed of the gearbox side of the clutch is "violent", oscillations are triggered in the transmission, which cause longitudinal vibrations on the vehicle, and are thus perceived by the driver and by possible passengers.

However, in the known, currently marketed automatic manual transmissions, the clutch is closed very slowly in order to obtain a "smooth" connection between the rotation speed of the engine side of the clutch and the rotation speed of the gearbox side of the clutch; such a mode is effective in avoiding the onset of oscillations in the transmission, but on the other hand increases the time needed to shift gears, and thus penalizes performance. The problem is particularly evident in double clutch gearboxes, in which the clutches are in an oil bath because, while in a dry clutch used in a conventional single clutch gearbox the transmitted torque remains virtually constant despite slip variations (i.e. differences of rpm between the two sides of the clutch), in an oil bath clutch used in a double clutch gearbox, the torque transmitted by the clutch clearly drops to small slip values, and such a drop of the transmitted torque has a high dispersion from clutch to clutch. Therefore, in an oil bath clutch, controlling the torque transmitted by the clutch at small slip values (i.e. when connecting the rotation speed of the engine side of the clutch to the rotation speed of the gearbox side of the clutch is required) is very complicated.

US2008207393A1 describes a clutch control method which determines a torque target which is to be transmitted by the clutch during a gear shift to reduce the total time required for the gear shift itself. A clutch controller controls an opening degree of the clutch by driving an clutch actuator according to the difference between the torque actually transmitted by the clutch and a target of the torque transmitted by the clutch; moreover, the clutch controller determines whether a speed difference between the two sides of the clutch is reduced with an adequate acceleration and, according to such a determination, the clutch controller corrects the target of the torque transmitted by the clutch.

SUMMARY

Various examples provide a control method for closing a clutch in an automatic manual transmission, which method is free from the above-described drawbacks while being easy and cost-effective to be implemented.

According to some examples, a control method for closing a clutch in an automatic manual transmission is provided as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION

Figure 1:
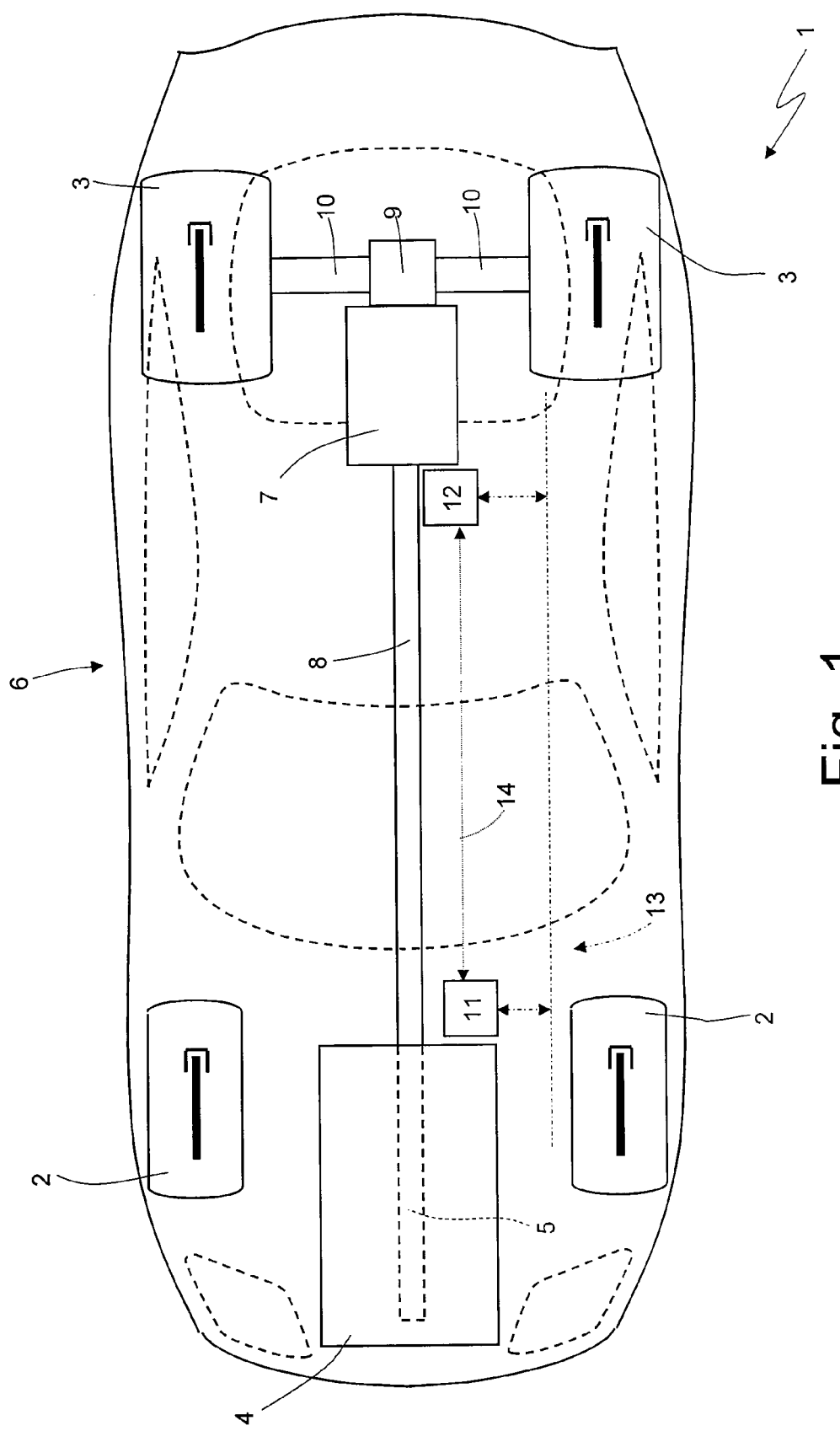
FIG. 1 is a diagrammatic plan view of a rear wheel drive vehicle provided with an automatic manual transmission which is controlled according to an examples control method.

In FIG. 1, numeral 1 indicates as a whole a vehicle (in particular, a car) provided with two front wheels 2 and two rear driving wheels 3; an internal combustion engine 4 is arranged in the frontal position, which is provided with a drive shaft 5 and produces a torque which is transmitted to the rear driving wheels 3 by means of an automatic manual transmission 6. Transmission 6 comprises a double clutch gearbox 7, arranged at the rear axle, and a transmission shaft 8 which connects the drive shaft 5 to an input of the gearbox 7. A self-locking differential 9 is arranged in cascade to gearbox 7, from which a pair of axle shafts 10 depart, each of which is integral with a rear driving wheel 3.

Vehicle 1 comprises a control unit 11 of engine 4, which governs the engine 4, a control unit 12 of transmission 6, which governs the transmission 6, and a bus line 13, which is made according to CAN (Car Area Network) protocol, extends throughout the vehicle 1 and allows the control units 11 and 12 to interface with each other. In other words, the control unit 11 of engine 4 and the control unit 12 of transmission 6 are connected to the bus line 13, and may thus communicate with each other by means of messages sent on the bus line 13 itself. Furthermore, the control unit 11 of engine 4 and the control unit 12 of transmission 6 are directly connected to each other by means of a dedicated synchronization wire 14, which is capable of directly transmitting a signal without the delays introduced by the BUS line 13 from the control unit 13 of transmission 6 to the control unit 12 of engine 4.

Figure 2:
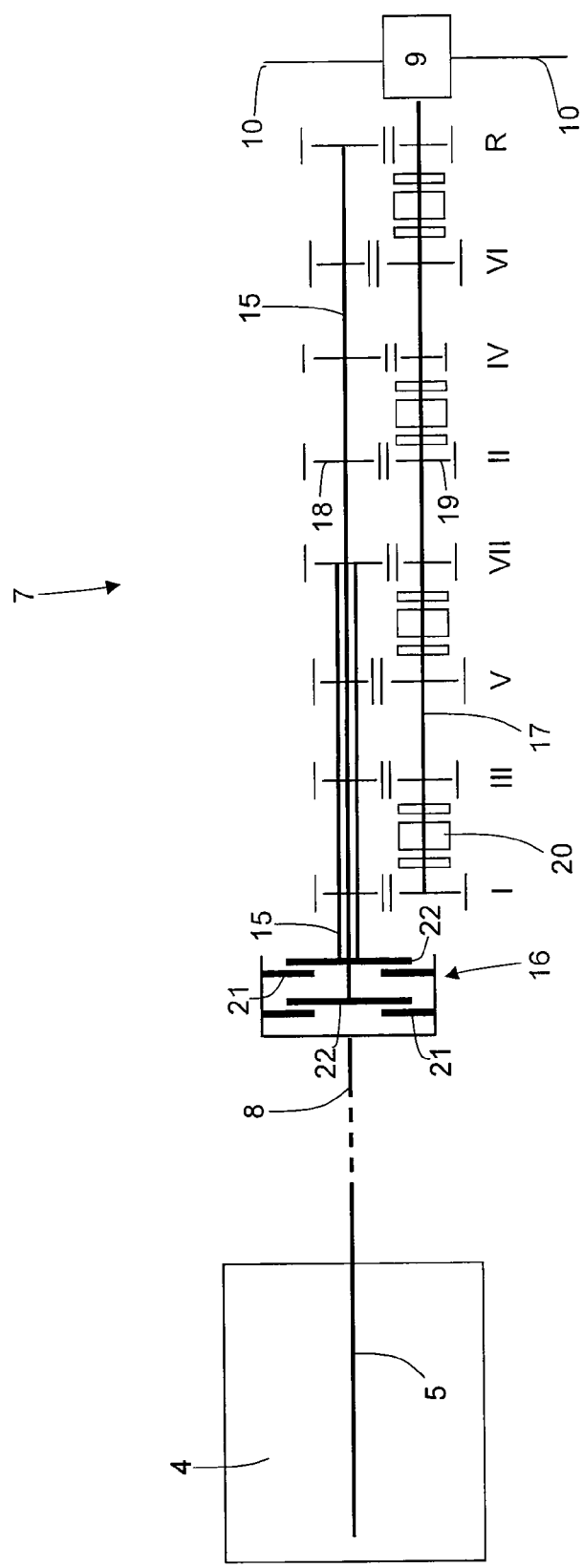
FIG. 2 is a diagrammatic view of the automatic manual transmission in FIG. 1, provided with a double clutch gearbox.

As shown in FIG. 2, the double clutch gearbox 7 comprises a pair of mutually coaxial, independent primary shafts 15, inserted one within the other. Furthermore, the double clutch gearbox 7 comprises two coaxial clutches 16 arranged in series, each of which is adapted to connect a respective primary shaft 15 to the drive shaft 5 of the internal combustion engine 4 by interposing the transmission shaft 8. The double clutch gearbox 7 comprises a single secondary shaft 17 connected to the differential 9 which transmits motion to the rear driving wheels 3; according to an alternative, equivalent embodiment, the double clutch gearbox 7 comprises two secondary shafts 17 both connected to the differential 9.

The double clutch gearbox 7 has seven forward speeds indicated by Roman numerals (first gear I, second gear II, third gear III, fourth gear IV, fifth gear V, sixth gear VI and seventh gear VII) and one reverse (indicated by the letter R). The primary shaft 15 and the secondary shaft 17 are mechanically coupled to each other by means of a plurality of gear pairs, each of which defines a respective speed and comprises a primary gear 18 mounted to the primary shaft 15 and a secondary gear 19 mounted to the secondary shaft 17. In order to allow the correct operation of the double clutch gearbox 4, all the odd speeds (first gear I, third gear III, fifth gear V, seventh gear VII) are coupled to a same primary shaft 5a, while all the even speed (second gear II, fourth gear IV, and sixth gear VI) are coupled to the other primary shaft 15.

Each primary gear 18 is keyed onto a respective primary shaft 15 to again integrally rotate with the primary shaft 15 itself, and permanently meshes with the respective secondary gear 19; instead, each secondary gear 19 is idly mounted to the secondary shaft 17. Moreover, the double clutch gearbox 7 comprises four double synchronizers 20, each of which is mounted so as to be coaxial to the secondary shaft 17, is arranged between two secondary gears 19, and is adapted to be actuated to alternatively engage the two respective secondary gears 19 onto the secondary shaft 17 (i.e. to alternatively make the two respective secondary gears 19 angularly integral with the secondary shaft 17). In other words, each synchronizer 20 may be displaced either in one direction to engage a secondary gear 19 onto the secondary shaft 17, or in the other direction to engage the other secondary gear 19 onto the secondary shaft 17.

Each clutch 16 has an engine side 21 which is angularly integral with the drive shaft 5 of engine 4 by interposing a transmission shaft 8, and a gearbox side 22 which is integral with a primary shaft 15 of the gearbox 7, which in turn may be made angularly integral with the secondary shaft 17, and thus with the rear driving wheels 3 by engaging a gear. When each clutch 16 is closed, the two sides 21 and 22 are angularly integral with each other and thus have to rotate at the same rotation speed; instead, when each clutch 16 is at least partially open, the two sides 21 and 22 are free to rotate at two different rotation speeds.

The modes of shifting from a current gear A to a successive gear B are described below. A shift up during the gear sequence will be described for simplicity, and therefore the current gear A has a higher transmission ratio than the successive gear B.

In an initial situation (i.e. before shifting the gear), a clutch 16A is closed to transmit motion to a primary shaft 15A, which in turn transmits motion to the secondary shaft 17 by means of the currently engaged gear A; a clutch 16B is, instead, open and thus isolates a primary shaft 15B from the transmission shaft 8. Before starting to shift up, the successive gear B is engaged to connect the primary shaft 15B to the secondary shaft 17 by means of the gear B itself; once the gear B has been engaged, the shifting starts by opening the clutch 16A to disconnect the primary shaft 15A (thus gear A) from the transmission shaft 8 (i.e. from the drive shaft 5 of engine 4), while closing the clutch 16B to connect the primary shaft 15B (thus gear B) to the transmission shaft 8 (i.e. to the drive shaft 5 of engine 4).

Figure 3:
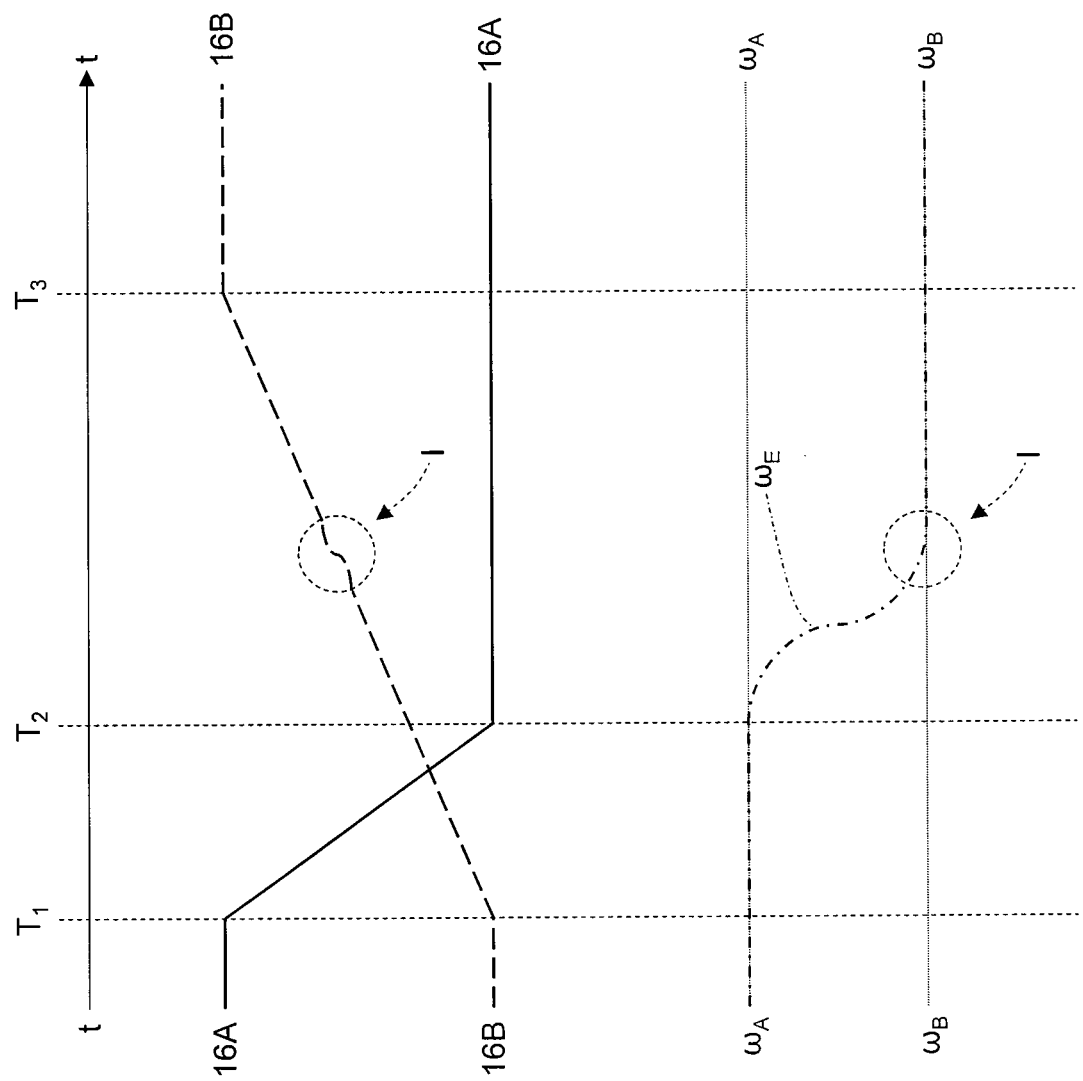
FIG. 3 shows the time evolution of the positions of the two clutches of the double clutch gearbox and of the rotation speed of a drive shaft of the engine while shifting gear.

The above-described shifting modes are diagrammatically shown in FIG. 3, which shows that before moment $T_1$, clutch 16A is closed and clutch 16B is open, and that clutch 16A starts opening while clutch 16B starts closing at moment $T_1$. At moment $T_2$, clutch 16A is completely open while clutch 16B is in an intermediate configuration (opening a clutch 16 is generally faster than closing it); at moment $T_3$, clutch 16B is completely closed and then, at moment $T_3$, the clutch 16A is opened and the clutch 16B is closed. It is thus apparent that the gear shifting starts at moment $T_1$ and ends at moment $T_3$. The rotation speed $\omega_E$ of the drive shaft 5 of engine 4 is equal to the rotation speed $\omega_A$ before shifting, it gradually drops towards the rotation speed $\omega_B$ while shifting, and is equal to the rotation speed $\omega_B$ after shifting.

As previously mentioned, the engine sides 21 of both clutches 16 are angularly integral with the drive shaft 5 of engine 4 by interposing the transmission shaft 8 and thus they always rotate at the same rotation speed $\omega_E$ as the drive shaft 5 of engine 4. The gearbox side 22 of clutch 16A is integral with the primary shaft 15A and until the current gear A is engaged, it rotates at a rotation speed $\omega_A$ which is equal to the rotation speed of the rear driving wheels 3 multiplied by the transmission ratio of the current gear A; similarly, the gearbox side 22 of the clutch 16B is integral with the primary shaft 15B and until the successive gear B is engaged, it rotates at a rotation speed $\omega_B$ which is equal to the rotation speed of the rear wheels 3 multiplied by the transmission ratio of the current speed B. By first approximation, when shifting gear, the forward traveling speed of vehicle 1 (thus the rotation speed of the rear driving wheels 3 and the rotation speed of the gearbox sides 22 of both clutches 16) is assumed to remain substantially constant when shifting gear; such an assumption is quite realistic because the duration of the gear shifting is short (indicatively a few tenth of a second) and, under normal conditions, the high total mechanical inertia of vehicle 1 does not allow large speed variations in such a short interval of time.

A model of engine 4 and transmission 6 is determined during a step of designing the vehicle 1, which allows the behavior of engine 4 and transmission 6 to be simulated; in particular, such a model uses the transmissibility functions of the clutches 16, each of which provides the torque which is transmitted by the corresponding clutch 16 according to the opening degree (i.e. to the position when controlling the position or to the hydraulic pressure when controlling the pressure) of the clutch 16 itself.

During the whole gear shift, i.e. from the moment $T_1$ of starting the opening of clutch 16A corresponding to the current gear A to the moment $T_3$ of completely closing the clutch 16B corresponding to the successive gear B, the control unit 12 determines a torque target $T_{C-TAR}$ which is to be transmitted through the clutches 16 according to the required evolution of the gear shift; in other words, the desired evolution of the gear shift is generally described by a speed target during the gear shift and by a longitudinal acceleration target during the gear shift, and according to these speed and acceleration targets, a torque target $T_{C-TAR}$ may be determined which is to be transmitted through the clutches 16. It is worth noting that the torque target $T_{C-TAR}$ which is to be transmitted by the clutches 16 is equal to the sum of a torque target $T_{CA-TAR}$ which is to be transmitted through the clutch 16A and a torque target $T_{CB-TAR}$ which is to be transmitted through the clutch 16B. According to the torque target $T_{C-TAR}$ which is to be transmitted through each clutch 16, the opening degree (i.e. the position when controlling the position or the hydraulic pressure when controlling the pressure) of the clutch 16 itself is determined by using the corresponding transmissibility function; in other words, once the required evolution of the torque target $T_{C-TAR}$ which is to be transmitted through each clutch 16 has been determined, the evolution of the opening degree (position or hydraulic pressure) is imposed by the physical features of the clutch 16 itself and is supplied by the corresponding transmissibility function.

During the whole gear shifting, i.e. from the moment $T_1$ of starting the opening of the clutch 16A corresponding to current gear A to the moment $T_3$ of completely closing the clutch 16B corresponding to the successive gear B, the control unit 12 of transmission 6 determines a target torque $T_{E-TAR}$ of the engine 4 according to the torque target $T_{C-TAR}$ which is to be transmitted through the clutches 16; moreover, the control unit 12 of transmission 6 communicates the target torque $T_{E-TAR}$ of the engine 4 to the control unit 11 of engine 4 by means of the bus line 13 and/or by means of the dedicated synchronization wire 14, so that the control unit 11 of engine 4 drives the engine 4 to pursue the torque target $T_{E-TAR}$ of the engine 4.

As shown in FIG. 3, until moment $T_2$ in which the clutch 16A is completely open, the rotation speed $\omega_E$ of the drive shaft 5 (i.e. the rotation speed $\omega_E$ of the engine side 21 of clutch 16B) is kept constant and equal to the rotation speed $\omega_A$ and is thus decreased only once the clutch 16A has been completely opened; such a control mode of the rotation speed $\omega_E$ of the drive shaft 5 is aimed at avoiding the clutch 16A from becoming braking, i.e. from generating a braking torque on the rear driving wheels 3.

After moment $T_2$, the rotation speed $\omega_E$ of the drive shaft 5 (i.e. the rotation speed $\omega_E$ of the engine side 21 of clutch 16B) is gradually decreased to reach the rotation speed $\omega_B$ of the primary shaft 15B (i.e. the rotation speed $\omega_B$ of the gearbox side 22 of clutch 16B) as quickly as possible; when the rotation speed $\omega_E$ of the engine side 21 of clutch 16B is close to the rotation speed $\omega_B$ of the gearbox side 22 of clutch 16B, i.e. at an impact interval I in which the rotation speed $\omega_E$ of the engine side 21 of clutch 16B approaches the rotation speed $\omega_B$ of the gearbox side 22 of clutch 16B (e.g. when the speed difference $\Delta\omega$ is lower than a threshold which may take the value of 250 rpm), a particular control mode is actuated to ensure that the connection between the rotation speed of the engine side 21 of clutch 16B and the rotation speed of the gearbox side 22 of clutch 16B is "smooth" and quick at the same time.

Figure 4:
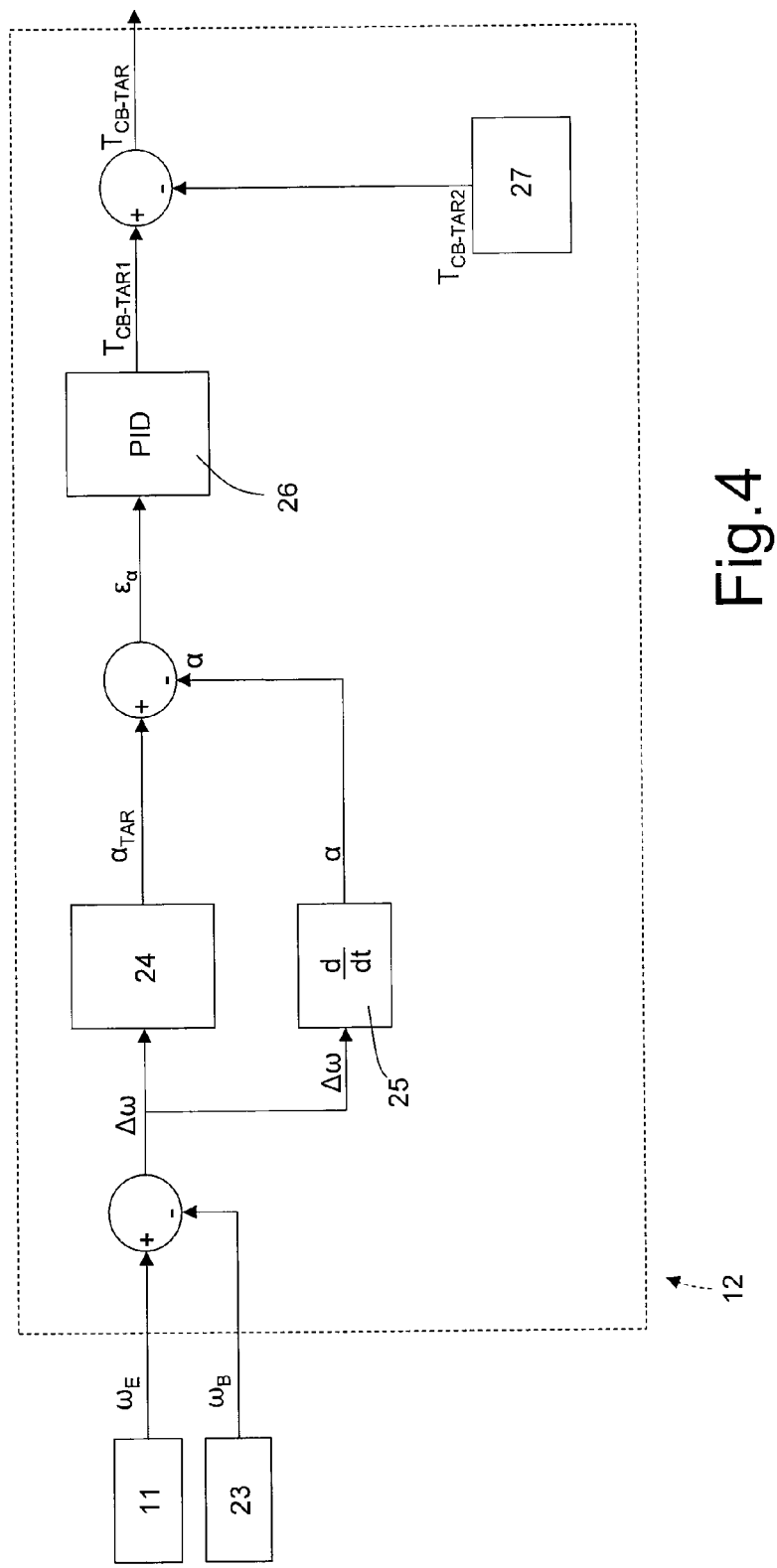
FIG. 4 is a block diagram of a driving logic of the manual automatic transmission in FIG. 1.

As shown in FIG. 4, when the rotation speed $\omega_E$ of the engine side 21 of clutch 16B (i.e. the rotation speed $\omega_E$ of the drive shaft 5) is close to the rotation speed $\omega_B$ of the gearbox side 22 of clutch 16B (i.e. to the rotation speed $\omega_B$ of the primary shaft 15B), thus at an impact interval I in which the rotation speed $\omega_E$ of the engine side 21 of clutch 16B approaches the rotation speed $\omega_B$ of the gearbox side 22 of clutch 16B, the control unit 12 of transmission 6 determines a speed difference $\Delta\omega$ between the rotation speed $\omega_E$ of the engine side 21 of clutch 16 and the rotation speed $\omega_B$ of the gearbox side 22 of clutch 16, thus determines an acceleration target $\alpha_{TAR}$ according to the speed difference $\Delta\omega$, and finally determines the torque target $T_{CB-TAR}$ which is to be transmitted through the clutch 16B also according to the acceleration target $\alpha_{TAR}$. For example, the acceleration target $\alpha_{TAR}$ is provided by a table which is stored during a step of designing and provides a corresponding acceleration target $\alpha_{TAR}$ for each speed difference $\Delta\omega$. In general, the acceleration target $\alpha_{TAR}$ gradually decreases as the speed difference $\Delta\omega$ decreases (i.e. the smaller the speed difference $\Delta\omega$, the smaller the acceleration target $\alpha_{TAR}$). Obviously, the acceleration target $\alpha_{TAR}$ is never completely cancelled because the speed difference $\Delta\omega$ is required to be quite quickly cancelled, therefore the acceleration target $\alpha_{TAR}$ must never been zero; such a result of stopping the decrease of the acceleration target $\alpha_{TAR}$ is obtained, e.g. by setting that when the speed difference $\Delta\omega$ is lower than a threshold, the acceleration target $\alpha_{TAR}$ is then equal to a constant, predetermined value.

In particular, a measuring sensor 23 (or, alternatively, an estimating algorithm) supplies the rotation speed $\omega_B$ of the gearbox side 22 of clutch 16B (i.e. the rotation speed $\omega_B$ of the primary shaft 15B) to the control unit 12 of transmission 6, and the control unit 11 of engine 4 supplies the rotation speed $\omega_E$ of the engine side 21 of clutch 16B (i.e. the rotation speed $\omega_E$ of the drive shaft 5) to the control unit 12 of transmission 6. The control unit 12 of transmission 6 determines the speed difference $\Delta\omega$ between the rotation speed $\omega_E$ of the engine side 21 of clutch 16B and the rotation speed $\omega_B$ of the gearbox side 22 of clutch 16B, and thus provides the speed difference $\Delta\omega$ both to a control block 24, which determines the acceleration target $\alpha_{TAR}$ according to the speed difference $\Delta\omega$, and to a derivation block 25 which determines the acceleration $\alpha$ deriving the speed difference $\Delta\omega$ over time. The control unit 2 of transmission 6 determines an acceleration error $\epsilon\alpha$ by comparing the acceleration $\alpha$ with the acceleration target $\alpha_{TAR}$, and thus determines a first contribution $T_{CB-TAR1}$ of the torque target $T_{CB-TAR}$, which is to be transmitted through the clutch 16B according to the acceleration target $\alpha_{TAR}$ by means of a PID regulator 26 PID which attempts to cancel the acceleration error $\epsilon\alpha$.

A control block 27 of the control unit 12 of transmission 6 determines a second contribution $T_{CB-TAR2}$ of the torque target $T_{CB-TAR}$ which is to be transmitted through the clutch 16B according to the desired evolution of the gear shift. The torque target $T_{CB-TAR}$ which is to be transmitted through the clutch 16B is determined by algebraically adding (i.e. taking the sign into account) the first contribution $T_{CB-TAR1}$ of the target torque $T_{CB-TAR}$ which is to be transmitted through the clutch 16B to the second contribution $T_{CB-TAR2}$ of the target torque $T_{CB-TAR}$ which is to be transmitted through the clutch 16B. From the above description, it is apparent that the first contribution $T_{CB-TAR1}$ of the torque target $T_{CB-TAR}$ which is to be transmitted through the clutch 16B is determined by means of a closed loop control (i.e. feedback control) and serves the function of conferring stability and robustness to the overall control, while the second contribution $T_{CB-TAR2}$ of the torque target $T_{CB-TAR}$ which is to be transmitted through the clutch 16B is determined by means of an open loop control and serves the function of conferring performance (i.e. rapidity) to the overall control. By varying the weight of the two contributions $T_{CB-TAR1}$ and $T_{CB-TAR2}$ of the torque objective $T_{CB-TAR}$ which is to be transmitted through the clutch 16B, robustness (and thus comfort) or performance (thus rapidity) may be favoured.

According to an alternative embodiment (not shown) gearbox 7 is of the single-clutch type and thus comprises only one clutch 16 and only one primary shaft 15; also in this case, the above-described control method is practically applied according to the same modes.

To summarize the above, the control unit 12 of transmission 6 normally determines the torque target $T_{CB-TAR}$ which is to be transmitted through the clutch 16B only according to the desired evolution of the position of clutch 16B; instead, when the rotation speed $\omega_E$ of the engine side 21 of clutch 16B is close to the rotation speed $\omega_B$ of the gearbox side 22 of clutch 16B, the torque target $T_{CB-TAR}$ which is to be transmitted through the clutch 16B is also determined according to an acceleration target $\alpha_{TAR}$ which depends on the speed difference $\Delta\omega$ between the rotation speed $\omega_E$ of the engine side 21 of clutch 16B and the rotation speed $\omega_B$ of the gearbox side 22 of clutch 16B. Thereby, a connection between the rotation speed $\omega_E$ of the engine side 21 of clutch 16B and the rotation speed $\omega_B$ of the gearbox side 22 of clutch 16B may be obtained, which is very "smooth" while being also particularly quick. Furthermore, it is very simple to calibrate such a connection to favour either "smoothness" or rapidity according to the driving style chosen by the driver (e.g. sporty or comfortable style) simply by adjusting the parameters of the calculation block 24 which determines the acceleration target $\alpha_{TAR}$ according to the speed difference $\Delta\omega$.

In brief, the above-described control method has many advantages. Firstly, a connection between the rotation speed $\omega_E$ of the engine side 21 of clutch 16B and the rotation speed $\omega_B$ of the gearbox side 22 of clutch 16B may be obtained, which is very "smooth" while being also particularly quick. Secondly, the above-described control method is simple and cost-effective to be implemented, because it does not require the installation of additional physical components, and does not results in increasing the power of the control unit 12 of transmission 6 as no high additional calculation power is needed.

The invention claimed is:

1. A control method for closing a clutch in an automatic manual transmission during a gear shifting to pass from a current gear (A) to a successive gear (B); the automatic gear transmission comprising a gearbox, which is provided with at least one primary shaft and at least one secondary shaft connected to driving wheels, and at least one clutch, which is interposed between the primary shaft of the gearbox and a drive shaft of an engine; the control method comprising, when, during the closing of the clutch, the rotation speed ($\omega_E$) of an engine side of the clutch is close to the rotation speed ($\omega_B$) of a gearbox side of the clutch, the steps of:

determining, by a transmission control unit, a speed difference ($\Delta\omega$) between the rotation speed ($\omega_E$) of the engine side of the clutch and the rotation speed ($\omega_B$) of the gearbox side of the clutch;

determining, by the transmission control unit, an acceleration target ($\alpha_{TAR}$) as a function of the speed difference ($\Delta\omega$) so that the acceleration target ($\alpha_{TAR}$) progressively decreases as the speed difference ($\Delta\omega$) decreases;

determining, by the transmission control unit, an acceleration ($\alpha$) by deriving in time the speed difference ($\Delta\omega$);

determining, by the transmission control unit, an acceleration error ($\epsilon\alpha$) by comparing the acceleration ($\alpha$) with the acceleration target ($\alpha_{TAR}$);

determining, by the transmission control unit, a target torque ($T_{CB-TAR}$) to be transmitted through the clutch according to the acceleration error ($\epsilon\alpha$) and using a PID regulator set to cancel the acceleration error ($\epsilon\alpha$); and controlling a clutch actuator in association with the target torque ($T_{CB-TAR}$).

2. The control method according to claim 1, and comprising the further steps of:

determining, by the transmission control unit, a first contribution ($T_{CB-TAR1}$) of the target torque ($T_{CB-TAR}$) to be transmitted through the clutch according to the acceleration error ($\epsilon\alpha$);

determining, by the transmission control unit, a second contribution ($T_{CB-TAR2}$) of the target torque ($T_{CB-TAR}$) to be transmitted through the clutch; and adding, by the transmission control unit, algebraically the first contribution ($T_{CB-TAR1}$) of the target torque ($T_{CB-TAR}$) to be transmitted through the clutch to the second contribution ($T_{CB-TAR2}$) of the target torque ($T_{CB-TAR}$) to be transmitted through the clutch (16B), in order to determine the target torque ($T_{CB-TAR}$) to be transmitted through the clutch.

3. The control method according to claim 2 and comprising the further step of determining, by the transmission control unit, the second contribution ($T_{CB-TAR2}$) of the target torque ($T_{CB-TAR}$) to be transmitted through the clutch using an open-loop control.

4. The control method according to claim 2 and comprising the further step of determining, by the transmission control unit, the first contribution ($T_{CB-TAR1}$) of the target torque ($T_{CB-TAR}$) to be transmitted through the clutch by using a closed-loop control.

5. The control method according to claim 1 and comprising the further steps of:

determining, by the transmission control unit, a target engine torque ($T_{E-TAR}$) of the engine according to the target torque ($T_{CB-TAR}$) to be transmitted through the clutch; and making, by an engine control unit, the engine pursue the target engine torque ($T_{E-TAR}$) of the engine.

6. The control method according to claim 1, wherein the gearbox is a double clutch gearbox and comprises two primary shafts and two clutches, each of which is interposed between the drive shaft of the engine and a corresponding primary shaft.

7. The control method according to claim 1 and comprising the further step of assigning, by the transmission control unit, to the acceleration target ($\alpha_{TAR}$) a constant value when the speed difference ($\Delta\omega$) is lower than a first threshold.

8. The control method according to claim 1 and comprising the further step of judging, by the transmission control unit, the rotation speed ($\omega_E$) of an engine side of the clutch close to the rotation speed ($\omega_B$) of a gearbox side of the clutch when the speed difference ($\Delta\omega$) is lower than a second threshold.

9. The control method of claim 1, wherein the control method comprises, only when, during the closing of the clutch, the rotation speed ($\omega_E$) of an engine side of the clutch is close to the rotation speed ($\omega_B$) of a gearbox side of the clutch, the steps of:
- determining, by the transmission control unit, a speed difference ($\Delta\omega$) between the rotation speed ($\omega_E$) of the engine side of the clutch and the rotation speed ($\omega_B$) of the gearbox side of the clutch;
- determining, by the transmission control unit, an acceleration target ($\alpha_{TAR}$) according to the speed difference ($\Delta\omega$) so that the acceleration target ($\alpha_{TAR}$) progressively decreases as the speed difference ($\Delta\omega$) decreases; and
- determining, by the transmission control unit, a target torque ($T_{CB-TAR}$) to be transmitted through the clutch according to the acceleration target ($\alpha_{TAR}$).

10. The method of claim 1, wherein determining, by the transmission control unit, a target torque ($T_{CB-TAR}$) to be transmitted through the clutch according to the acceleration target ($\alpha_{TAR}$) includes determining a target torque ($T_{CB-TAR}$) that has to be transmitted through the clutch according to the acceleration target ($\alpha_{TAR}$).

11. A control method for closing a clutch in an automatic manual transmission during a gear shifting to pass from a current gear (A) to a successive gear (B); the automatic gear transmission comprising a gearbox, which is provided with at least one primary shaft and at least one secondary shaft connected to driving wheels, and at least one clutch, which is interposed between the primary shaft of the gearbox and a drive shaft of an engine; the control method comprising, when, during the closing of the clutch, the rotation speed ($\omega_E$) of an engine side of the clutch is close to the rotation speed ($\omega_B$) of a gearbox side of the clutch, the steps of:
- determining, by a transmission control unit, a speed difference ($\Delta\omega$) between the rotation speed ($\omega_E$) of the engine side of the clutch and the rotation speed ($\omega_B$) of the gearbox side of the clutch;
- determining, by the transmission control unit, an acceleration target ($\alpha_{TAR}$) according to the speed difference ($\Delta\omega$) so that the acceleration target ($\alpha_{TAR}$) progressively decreases as the speed difference ($\Delta\omega$) decreases;
- determining, by the transmission control unit, a first contribution ($T_{CB-TAR1}$) of a target torque ($T_{CB-TAR}$) to be transmitted through the clutch according to the acceleration target ($\alpha_{TAR}$) and using a closed-loop control;
- determining, by the transmission control unit, a second contribution ($T_{CB-TAR2}$) of the target torque ($T_{CB-TAR}$) to be transmitted through the clutch using an open-loop control;
- adding, by the transmission control unit, algebraically the first contribution ($T_{CB-TAR1}$) of the target torque ($T_{CB-TAR}$) to be transmitted through the clutch to the second contribution ($T_{CB-TAR2}$) of the target torque ($T_{CB-TAR}$) to be transmitted through the clutch (16B), in order to determine the target torque ($T_{CB-TAR}$) to be transmitted through the clutch; and
- controlling a clutch actuator in association with the target torque ($T_{CB-TAR}$).

12. A control method for closing a clutch in an automatic manual transmission during a gear shifting to pass from a current gear (A) to a successive gear (B); the automatic gear transmission comprising a gearbox, which is provided with at least one primary shaft and at least one secondary shaft connected to driving wheels, and at least one clutch, which is interposed between the primary shaft of the gearbox and a drive shaft of an engine; the control method comprising, when, during the closing of the clutch, the rotation speed ($\omega_E$) of an engine side of the clutch is close to the rotation speed ($\omega_B$) of a gearbox side of the clutch, the steps of:
- determining, by a transmission control unit, a speed difference ($\Delta\omega$) between the rotation speed ($\omega_E$) of the engine side of the clutch and the rotation speed ($\omega_B$) of the gearbox side of the clutch;
- assigning, by the transmission control unit and when the speed difference ($\Delta\omega$) is comprised between a first threshold and a second threshold lower than the first threshold, to an acceleration target ($\alpha_{TAR}$) a variable value depending on the speed difference ($\Delta\omega$) so that the acceleration target ($\alpha_{TAR}$) progressively decreases as the speed difference ($\Delta\omega$) decreases;
- assigning, by the transmission control unit and when the speed difference ($\Delta\omega$) is lower than the second threshold, to the acceleration target ($\alpha_{TAR}$) a constant and predetermined value;
- determining, by the transmission control unit, a target torque ($T_{CB-TAR}$) to be transmitted through the clutch according to the acceleration target ($\alpha_{TAR}$); and
- controlling a clutch actuator in association with the target torque ($T_{CB-TAR}$).

* * * * *